United States Patent [19]

Proell et al.

[11] Patent Number: 4,970,799
[45] Date of Patent: Nov. 20, 1990

[54] DEVICE FOR MEASURING A SHAFT KEYWAY AND METHOD OF USING

[75] Inventors: Heinz Proell, Brookfield; Dietrich Wienss, Pewaukee; John Fischer, Wauwatosa, all of Wis.

[73] Assignee: Dreier Corporation, Brookfield, Wis.

[21] Appl. No.: 513,062

[22] Filed: Apr. 23, 1990

[51] Int. Cl.$^5$ .............................................. G01B 5/00
[52] U.S. Cl. ................................... 33/519; 33/501.09; 33/548
[58] Field of Search ............... 33/501.09, 501.3, 501.4, 33/519, 533, 548, DIG. 14

[56] References Cited

U.S. PATENT DOCUMENTS 2,807,091   9/1957   Michelson ............................. 33/519

FOREIGN PATENT DOCUMENTS 0769303  10/1980  U.S.S.R. ................................. 33/519

Primary Examiner—Harry N. Haroian
Attorney, Agent, or Firm—A. W. Breiner; Mary J. Breiner

[57] ABSTRACT

A device for measuring the centering, parallelism, and perpendicularity of the side walls of a keyway to the centerline of the keyway in a shaft is described. The preferred embodiment of the device includes a micrometer slidingly attached to the device, a horizontal indicator dial slidingly attached to the device and connected to a horizontally extending probe which is positionable in a shaft keyway, a vertical indicator dial slidingly attached to the device and connected to a vertically extending probe positionable in a shaft keyway, and two stationary legs extending downward from the device for seating in a shaft keyway. In operation, the horizontal indicator dial and horizontal probe are utilized to check the centering and parallelism to the centerline of the keyway and the vertical indicator dial and vertical probe are utilized to check the perpendicularity of the keyway side walls to the centerline of the keyway. The indicator dials and the micrometer indicate the accuracy of the cut and any variations which may be present thereby indicating the corrections required.

4 Claims, 2 Drawing Sheets

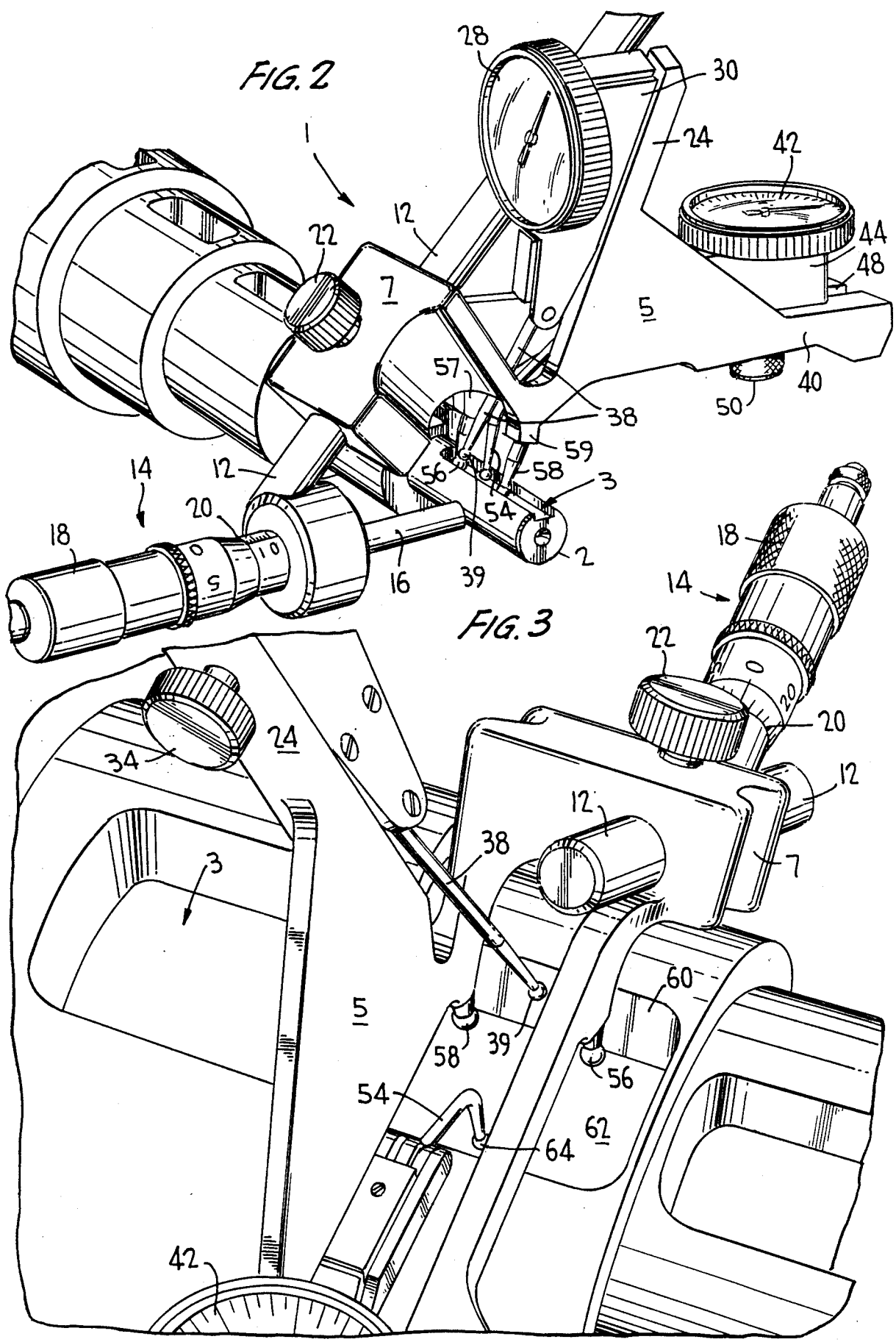

DEVICE FOR MEASURING A SHAFT KEYWAY AND METHOD OF USING

FIELD OF THE INVENTION

The present invention is directed to a device for measuring the centering, parallelism and perpendicularity to the centerline of a keyway formed in a shaft and a method of using the device. The device measures the keyway for accuracy of cut and, in the event the cut is in error, is capable of indicating the variation present and thereby the correction necessary to be made.

BACKGROUND OF THE INVENTION

Various gauge means for checking the accuracy of a keyway cut in a shaft are known in the art. The devices as known in the art, however, are not capable of measuring the perpendicularity of the keyway side walls to the centerline of the keyway. The devices as known are capable of only measuring the centering and/or parallelism of a shaft keyway. In order to check for the perpendicularity of the keyway side walls, separate time consuming measurements are required unless an instrument having a key cut to size to fit within the keyway is utilized. Such an instrument results in added cost of the cutting and measuring operation since the device is suitable for use with only one size keyway.

For example, the use of a horizontal indicator dial and probe in conjunction with a micrometer is currently available on the market through the company A.u.W. Busch GmbH and Company. This device, however, does not contain any means for measuring the perpendicularity of a keyway side wall to the centerline of the keyway.

U.S. Pat. No. 2,494,152 describes a tool for checking the centrality and alignment of a keyway in a shaft. The tool utilizes a stationary block which is set in the keyway followed by an adjustment of the tool utilizing a separate leveling device. To determine if the keyway is in alignment and properly centered, the tool is removed from the keyway and repositioned at the opposite end of the keyway and opposite side of the shaft to see if the level of the keyway remains the same. If the level is not the same, the shaft is misaligned and non-centered. The separate leveling device is the only indicator of the amount of the inaccuracy present.

U.S. Pat. No. 2,611,187 describes a gauge for measuring the misalignment of a shaft keyway which includes the use of a dial to indicate the amount the keyway is off. The structure of the gauge utilized is complex in nature and is not capable of measuring the perpendicularity of the shaft side walls.

U.S. Pat. No. 2,556,761 describes a tool combination including a micrometer caliper and a dial gauge. The dial gauge functions to give plus or minus readings without resetting the caliper. The micrometer caliper is utilized to measure the outside diameter and the mean dimension of a shaft, however, and is not disclosed for measuring a keyway.

U.S. Pat. No. 3,457,650 describes a keyway gauge used for aligning a tool which will cut a keyway and for checking the accuracy of the cut. A micrometer or dial gauge can be utilized to set the initial position of the gauge to provide for an accurate cut.

Accordingly, the art does not describe a device which is capable of measuring the perpendicularity of keyway side walls to the centerline of a shaft keyway either alone or in combination with a means of measuring the centering and parallelism of a keyway shaft.

OBJECTS OF THE INVENTION

A primary object of the present invention is to provide a device for measuring the perpendicularity of a keyway's side walls to the centerline of the keyway.

A further primary object of the present invention is to provide a device for measuring the perpendicularity of a keyway's side walls to the centerline of the keyway and which is also capable of indicating any variation which is present and thereby indicate the correction necessary to be made to the keyway cut.

A further primary object of the present invention is to provide a device capable of measuring the perpendicularity of a keyway's side walls to the centerline of the keyway as well as measuring the centering and parallelism of the keyway, including indicating any variation which is present and thereby the correction necessary to be made to the keyway.

A further primary object of the present invention is to provide a device for measuring the accuracy of cut for a keyway in a shaft which is capable of being utilized with keyways and shafts of varying dimensions.

A further primary object of the present invention is to provide a method of utilizing the device of the present invention for measuring the perpendicularity of a keyway's side walls to the centerline of a shaft keyway.

BRIEF DESCRIPTION OF THE INVENTION

The present invention is directed to a device for measuring the perpendicularity of a shaft keyway's side walls to the centerline of the keyway cut in a shaft including when the device is also capable of measuring the centering and parallelism of the keyway formed and a method of using the device.

The preferred embodiment of the device of the present invention includes a micrometer slidingly attached to the device, a vertical indicator dial slidingly attached to the device and connected to a vertically extending probe which is positionable in a shaft keyway, a horizontal indicator dial slidingly attached to the device and connected to a horizontally extending probe positionable in a shaft keyway and two stationary legs extending downward from the device for seating in a shaft keyway.

In operation, the horizontal indicator dial and horizontal probe are utilized to check the centering and parallelism of the keyway and the vertical indicator dial and vertical probe are utilized to check the perpendicularity of the keyway side walls to the centerline of the keyway.

In use, the two stationary legs are positioned in one of the base angles which are formed at the point which one side wall of the keyway meets the base wall of the keyway. The micrometer is then positioned so that it abuts the approximate centerline of the shaft. To check the centering of the keyway, the tip of the horizontal probe is positioned approximately one-half the distance across the keyway from the two stationary legs of the device. The micrometer is set at zero while making sure that the horizontal probe tip remains in contact with the keyway base. The horizontal indicator dial is then set to zero. Thereafter, the device is removed from the shaft keyway and turned 180° and repositioned in the keyway in the same manner but without adjustment to the dials or probe position. The reading on the horizontal indicator dial should still be zero. If it is not, the micrometer is moved in or out to provide the variation present which indicates the correction to be made.

To check the parallelism to the centering of the keyway, the same procedure is followed as in checking the centering of the keyway with the exception that rather than turning the gauge 180° at the same point in the keyway, the device is moved to the opposite end of the keyway. The reading on the horizontal indicator dial should remain at zero following the repositioning, and if not, the micrometer is turned until the horizontal indicator dial registers zero. The reading on the micrometer then indicates the variation and the correction to be made.

To check the perpendicularity of the keyway side walls to the centerline of the keyway, the vertical indicator dial and probe are utilized. The device is positioned in the keyway in the same manner with respect to the stationary legs and micrometer as for checking the centering and parallelism of the shaft. The vertical indicator probe is adjusted downward until the probe tip touches the keyway side wall a suitable distance below the top edge of the side all, for example, approximately 0.1 inch down the side of the wall. The vertical indicator dial and micrometer are each set to zero. The device is then removed from the keyway and turned 180° and repositioned in the shaft keyway making sure the stationary legs are seated properly in the keyway base and that the vertical probe tip is touching the opposite side wall the same distance down the side wall of the keyway as when positioned against the first side wall. The reading on the vertical indicator dial should still be zero, and if not, the reading on the indicator dial will tell the variation, and accordingly, the correction to be made.

BRIEF DESCRIPTION OF THE DRAWINGS

FIG. 2 is a perspective view of the measuring device of the present invention situated in relation to a shaft and its keyway. FIG. 2 views the device from the side opposite that shown in FIG. 1.

FIG. 3 is a detailed perspective view of the horizontal probe, vertical probe, and stationary legs of the measuring device of the present invention situated in a keyway during a measuring operation utilizing the device.

DESCRIPTION OF THE PRESENTLY PREFERRED EMBODIMENT

Figure 1:
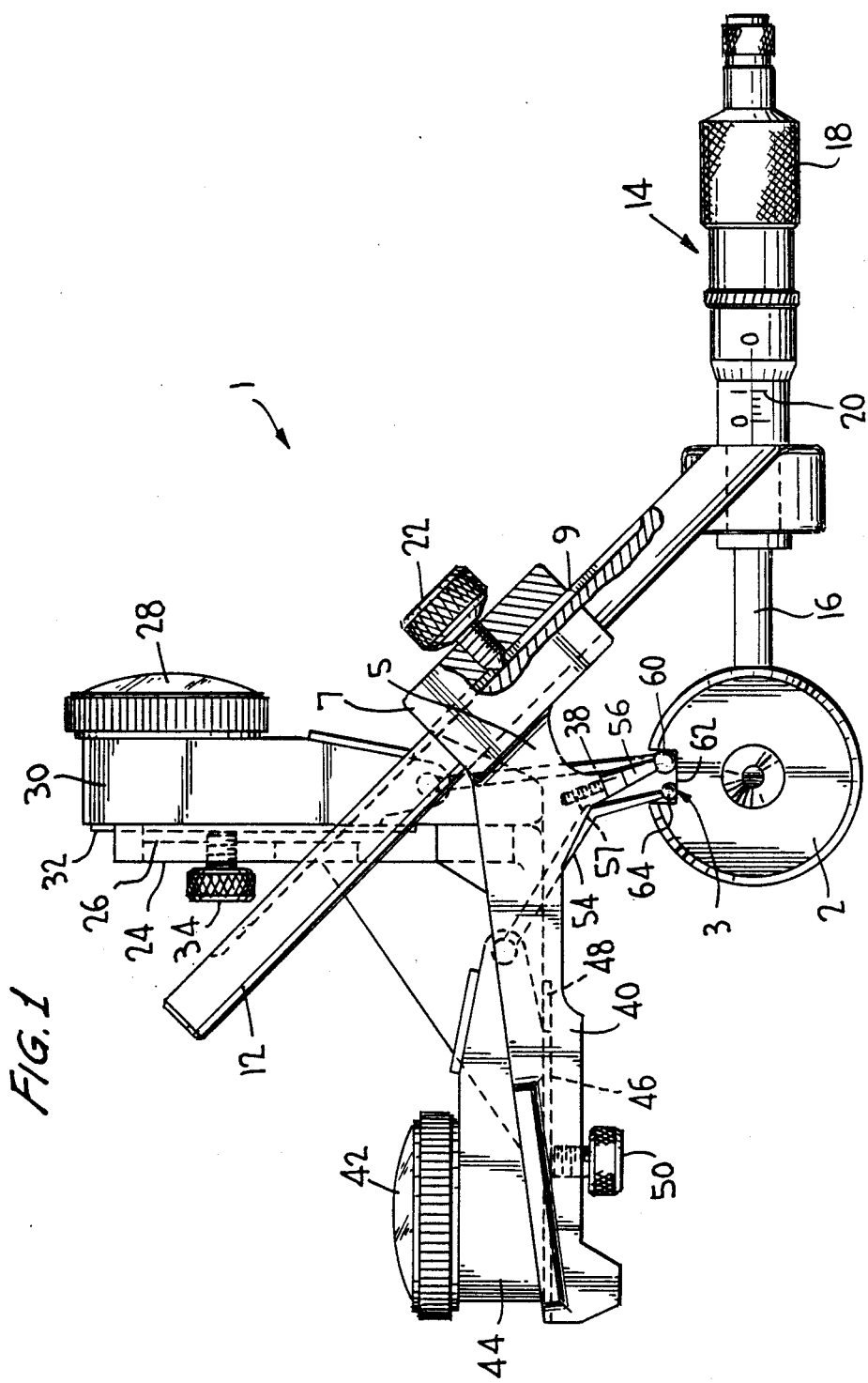
FIG. 1 is a side view of the preferred embodiment of the present invention including a micrometer, a horizontal indicator dial connected to a horizontally extending probe, a vertical indicator dial connected to a vertically extending probe and two stationary legs shown in relation to a shaft and a keyway therein as used in a measuring operation of the shaft keyway.

The present invention is directed to a device for measuring a keyway formed in a shaft and a method of utilizing the device. The accuracy of the cut of a keyway in a shaft is very important to the use of the shaft and involves precise measurements. In the event that variation, i.e. inaccuracy, is present in the cut of the keyway, the shaft can be rendered useless for a particular purpose. Accordingly, it is necessary to be able to effectively and efficiently measure the dimensions of a shaft keyway to ensure that the cutting operation is proceeding correctly and to ensure that a properly cut shaft is present prior to use of the shaft. If the inspection procedures utilized in determining the proper dimensions of a keyway require large expenditure of time, the cost of the manufacture of the shaft will rise undesirably. The device of the present invention provides for an efficient and exact means for determining the accuracy of the cut of a keyway in a shaft. More particularly, the preferred embodiment of the present invention can determine the accuracy of the cut of a shaft keyway by checking the centering, parallelism, and perpendicularity of the side walls of the keyway.

The device of the present invention can be utilized with shafts of varying sizes and keyways of varying sizes by simple adjustments to the device as will be described further below. The drawings illustrate the preferred embodiment of the device of the present invention and the manner in which the device is positioned in relation to a shaft and its keyway to carry out the different measuring operations. The device, denoted generally as 1, is positioned in relation to a shaft 2 and its keyway 3.

The device 1 of the invention includes a unitary body 5 which is preferably made of a solid material, such as a cast metal, for example iron, iron alloy or the like. The material from which the body is made must be such as to provide strength to the device so as to prevent imprecision in the measurements taken utilizing the device by maintaining the parts of the device in proper relation to each other.

One portion of body 5 is a hand or finger grip portion 7 which has a passageway 9 formed therein which extends through the length and each end of finger grip portion 7. A bar 12 passes in sliding relation through passageway 9 in finger grip 7. A micrometer 14 is connected by a suitable means to the base of bar 12. The micrometer includes a forward extending member or projection 16 which is movable upon rotation of the handle 18 of micrometer 14. Micrometer 14 contains conventional gauge indicia 20 for indicating degrees of measurement. Upon rotation of handle 18 of micrometer 14, plus or minus readings in relation to the indicia are available. A screw nut 22 is threadedly engaged in finger grip 7 in perpendicular relationship to passageway 9 so that screw nut 22 can come in contact with bar 12 upon tightening of screw nut 22. Screw nut 22 is utilized to secure bar 12 in place in passageway 9. When screw nut 22 is loosened, bar 12 is slidingly movable within passageway 9 thereby allowing micrometer 14 to be moved into various positions. This allows the device to be adapted, and thereby usable with, shafts of varying sizes.

Body 5 of the device additionally has an upwardly extending arm 24 having groove 26 formed therein. An indicator dial 28 is attached to a body 30 which has a lengthwise projection 32 which fits within groove 26 to allow for the sliding engagement of indicator dial 28 and body 30 to arm 24. A screw nut 34 is threadedly engaged to arm 24 in perpendicular relationship to groove 26 in arm 24. When screw nut 34 is screwed inward into arm 24, screw nut 34 abuts projection 32 and serves to hold body 30 in a desired location. By unscrewing or loosening screw nut 34, body 30 of the dial indicator 28 can slide in groove 26 and thereby have its position adjusted.

Extending downward from the base of body 30 is a vertical probe 38. Vertical probe 38 is functionally attached to dial indicator 28 through body 30 in a conventional manner so that pressure upon vertical indicator 38 will provide a corresponding reading upon dial 28. For example, dial indicator 28 provides measurement in increments of 0.0005 inches. Vertical probe 38 is touch sensitive so that upon pressure on the tip 39 of vertical probe 38, the dial will move in corresponding relation to the amount by which vertical probe 38 has moved. The sensitivity of the probe and the dial indicator increments utilized can vary and will depend upon the precision desired. This is determined utilizing conventional criteria.

Body 5 additionally has a horizontally extending arm 40 to which a horizontal indicator dial 42 is attached in a manner similar to that of vertical indicator dial 28.

More specifically, horizontal indicator dial 42 is attached to body 44 which has a lengthwise projection 46. Projection 46 is complementary to and fits within groove 48 formed in horizontal arm 40. Accordingly, body 44 and dial indicator 42 are slidably attached to horizontal arm 40. A screw nut 50 is threadedly engaged in horizontal arm 40 in perpendicular relation to groove 48. Upon tightening screw nut 50, screw nut 50 is caused to abut body 44 and serves to hold body 44 in a desired position. Upon loosening of screw nut 50, body 44 is slidable within groove 48. Attached to body 44 of vertical indicator 42 is a horizontally extending probe 54. Probe 54 extends at a downward angle through body 5 at approximately the same point as vertically extending probe 38. Body 5 contains an opening therein, as best shown in FIG. 3, which permits vertically extending probe 38 and horizontally extending probe 54 to pass through body 5 so that upon positioning of device 1 on a shaft, probes 38 and 54 can extend into a keyway 3 formed in shaft 2 as will be further described below. Horizontally extending probe 54 angles downward in an appropriate manner as illustrated in the drawings. Probe 54 is touch sensitive as with vertical probe 38 so that when pressure is placed on probe 54, a corresponding reading is transmitted to dial indicator 42. The measuring increments present on dial indicator 42 are such as to be useful for the nature of the measurement work being performed. In the device of the invention preferable increments are 0.0005 inches.

Additionally extending from body 5 of device 1 of the present invention are first and second stationary legs 56 and 58. Stationary legs 56 and 58 are parallel to each other and of the same length. Legs 56 and 58 extend downward from body 5 a predetermined length. The length is dictated by the sizes of keyway shafts to be measured. Legs 56 and 58 must be capable of being seated in the angle where the side wall of the keyway meets the base wall while maintaining device 1 over the shaft. The extent probe 54 extends downward is approximately the same as that of stationary legs 56 and 58. Each of these members ultimately come into contact with the base wall of the shaft keyway.

In operation, horizontal indicator dial 42 and horizontal probe 54 are utilized to check the centering and parallelism to the centerline of a keyway and vertical indicator dial 28 and vertically extending probe 38 are utilized to check the perpendicularity of the keyway side walls to the centerline of the keyway.

In use, stationary legs 56 and 58 are positioned in one base angle formed at the point one side wall 60 of the keyway meets the base wall 62 of the keyway. Screw nut 22 is then loosened allowing bar 12 to slide within finger grip portion 7 of body 5 of the device. Bar 12 is moved until forward extending arm 16 is positioned across from the approximate centerline of shaft 2. Screw nut 22 is then tightened to hold bar 12 in place and, accordingly, hold arm 16 in position. Handle 18 of micrometer 14 is then rotated until forwardly extending arm 16 abuts shaft 2 along the approximate centerline of the shaft.

To check the centering of keyway 3, screw nut 50 is loosened and body 44 adjusted until tip 64 of horizontally extending probe 54 is positioned approximately one-half the distance across the keyway from stationary legs 56 and 58. Screw nut 50 is then tightened to hold probe 54 in place. The micrometer is set to zero to provide a datum point. Dial indicator 42 is also set to zero. At the time the micrometer and indicator probe are set to zero, the position of tip 64 and stationary legs 56 and 58 should be checked to make sure they remain in proper contact with base wall 62 of keyway 3. Thereafter, the user picks up device by means of finger grip 7 and removes the device from the shaft keyway. The device is turned 180° and repositioned in the keyway immediately opposite the position at which the device was originally set in the same manner as described above but without adjustment of the dial, micrometer or probe position. The reading on horizontal indicator dial 42 should still be zero. If it is not, this indicates that the cut of the keyway is in error and that the keyway is not centered. To determine the extent of the inaccuracy, the micrometer is moved in or out by rotating handle 18 to indicate the variation present and the correction to be made in the shaft keyway. The reading on indicator dial 42, if an inaccuracy is present, is a result of the pressure on touch sensitive probe 54. The pressure is caused by the difference in the level of the base wall between the first and second positions of the device in the keyway. If no inaccuracy is present, probe 54 sits in the same manner as originally set.

To check the parallelism to the centering of the keyway, the same procedure is followed as in checking the centering of the keyway as above described with the exception that rather than turning the device 180 at the same point in the keyway, the device is moved to the opposite end of the keyway and repositioned in the keyway. The reading on the horizontal indicator dial should remain at zero following the repositioning, and if not, the micrometer is turned until the horizontal indicator registers zero. The reading on the micrometer then indicates the variation and the correction to be made.

To check the perpendicularity of the keyway side walls to the centerline of the keyway, vertical indicator dial 28 and vertical probe 38 are utilized along with micrometer 14 and dial indicator 42. Device 1 is positioned in keyway 3 in the same manner for checking the centering of the keyway to the shaft. The micrometer is set to zero and dial 42 is also set to zero. Then vertical probe 38 is adjusted in relation to the keyway side walls.

More specifically, screw nut 34 is loosened allowing vertical indicator probe 38 to be adjusted upward or downward until probe tip 39 touches a keyway side wall, such as 60, at a predetermined distance down from the top edge of the side wall, preferably approximately 0.1 inch down the side of the wall. Screw nut 34 is then tightened to maintain vertical body 30, and thereby probe 38, in position. Vertical indicator dial 28 is set to zero. Finger grip 7 is then utilized to remove the device from the keyway and turn the device 180°. The device is then repositioned in the shaft keyway in the same manner as described above making sure stationary legs 56 and 58 are seated properly in the angle of keyway base and side wall and that vertical probe tip 39 is touching the opposite side wall the same approximate distance down the side of the wall in the keyway as in the first measurement. Indicator dial 42 should read zero. If not, rotate micrometer handle 18 in or out to bring indicator dial 42 to zero. Then read indicator 28. The reading on vertical indicator dial 28 should still be zero. A zero reading indicates that the perpendicularity of the side walls to the centerline of the keyway is accurate. If an inaccuracy is present, the reading on the indicator dial 28 will tell the variation and, accordingly, the correction to be made to the keyway measurement. Adjustment to the micrometer is not necessary. The micrometer is utilized to anchor the device and provide a datum point so that it can be determined whether the device was improperly adjusted upon repositioning of the device.

The relation of vertical probe 38 and horizontal probe 54 in the keyway shaft, as well as stationary legs 56 and 58 during the respective measuring operations is best shown in FIG. 3.

While it is understood that the preferred embodiment provides for both a horizontal indicator dial and horizontal probe and a vertical indicator dial and vertical probe so that the centering, parallelism and perpendicularity of the shaft keyway can be measured by one device, it is understood that a device having only the vertical measuring means alone is possible upon minor variations in the above-described device. Specifically, the horizontal indicator dial, body and probe would not be present. Otherwise, the body of the device would remain essentially the same as shown in FIG. 1. The advantage of the preferred embodiment, however, is to provide a single unitary device capable of measuring all aspects of a keyway in a shaft without the need of separate instruments.

As will be apparent to one skilled in the art, various modifications can be made within the scope of the aforesaid description. Such modifications being within the ability of one skilled in the art form a part of the present invention and are embraced by the appended claims.

It is claimed:

1. A device for measuring the centering, parallelism, and perpendicularity of the side walls of a shaft keyway comprising:
   (a) a body having a finger grip portion, a vertically extending arm, a horizontally extending arm and a first and second stationary leg extending downward from said body;
   (b) a bar slidingly attached to said finger grip portion of said body having a micrometer affixed to the downward end of said bar, said micrometer having a forwardly extending movable member;
   (c) a pressure sensitive vertically extending probe operatively connected to an indicator device which is slidingly attached to said vertically extending arm of said body; and
   (d) a pressure sensitive horizontal and downward extending probe operatively connected to an indicator device which is slidingly attached to said horizontally extending arm of said body.

2. A device according to claim 1 wherein said body is of one unitary piece.

3. A device according to claim 2 wherein said unitary body is made of a cast metal.

4. A method of measuring the perpendicularity of the side walls of a shaft keyway to the centerline of said keyway utilizing the device according to claim 1 comprising:
   (a) abutting said forwardly extending movable member of said micrometer against the approximate centerline of said shaft containing said keyway;
   (b) positioning said first and second stationary legs at a point at which a first side wall of said keyway joins the base wall of said keyway;
   (c) sliding said vertical indicator device so that said vertically extending probe connected thereto abuts said first side wall of said keyway a predetermined distance down from the top edge of said side wall and maintaining said indicator device at that point;
   (d) setting said indicator devices connected to said vertically extending probe and said horizontally extending probe and said micrometer each to a datum point;
   (e) removing said device from said keyway;
   (f) turning said device 180° and repositioning said device in said keyway without moving said forwardly extending member of said micrometer or said vertical or horizontal probes so that said forwardly extending member abuts the approximate centerline of the opposite side of said shaft and said first and second stationary legs are positioned at a point which a second side wall of said keyway joins said base wall of said keyway, and said vertically extending probe touches said second side wall of said keyway; and
   (g) comparing the reading on said horizontal indicator device in step (d) with the reading on said indicator device after said device is repositioned in said keyway according to step (f), if said reading is not equal, adjusting said micrometer until said reading is equal, and then comparing the reading on said vertical indicator device in step (d) with the reading on said vertical indicator device after being repositioned in said keyway according to step (f).

* * * * *